United States Patent [19]

Plummer

[11] 4,147,408
[45] Apr. 3, 1979

[54] BACK PROJECTION VIEWING SCREEN

[75] Inventor: William T. Plummer, Concord, Mass.

[73] Assignee: Polaroid Corporation, Cambridge, Mass.

[21] Appl. No.: 754,012

[22] Filed: Dec. 23, 1976

[51] Int. Cl.$^2$ .......................................... G03B 21/60
[52] U.S. Cl. .................................. 350/128; 352/104; 352/130
[58] Field of Search ................. 350/127, 128; 352/81, 352/104, 43, 86, 130

[56] References Cited
U.S. PATENT DOCUMENTS

| | | | |
|---|---|---|---|
| 1,984,004 | 12/1934 | Wildhaber | 352/81 |
| 3,848,980 | 11/1974 | Plummer | 350/128 |
| 3,893,748 | 7/1975 | Depalma | 350/128 |

*Primary Examiner*—Monroe H. Hayes
*Attorney, Agent, or Firm*—Frederick A. Goettel, Jr.

[57] ABSTRACT

A back projection viewing screen comprising two parallel transparent sheets of plastic, each having its faces optically configured. The surfaces have the following characteristics arranged in the order from the projection side to the viewing side: (1) an ordinary circular Fresnel lens to which a light frosted texture has been applied; (2) a series of parallel vertical convex circular lenticulations joined by sharply defined cusps; (3) a series of parallel vertical convex lenticulations joined by sharp cusps and having an elliptical cross-section. The lenticulations on this third surface have a very different periodicity from that of the second surface to avoid the possibility of moiré patterns; (4) the viewing surface of the screen is defined by a series of parallel horizontal convex lenticulations, each having a convex elliptical cross-section.

4 Claims, 5 Drawing Figures

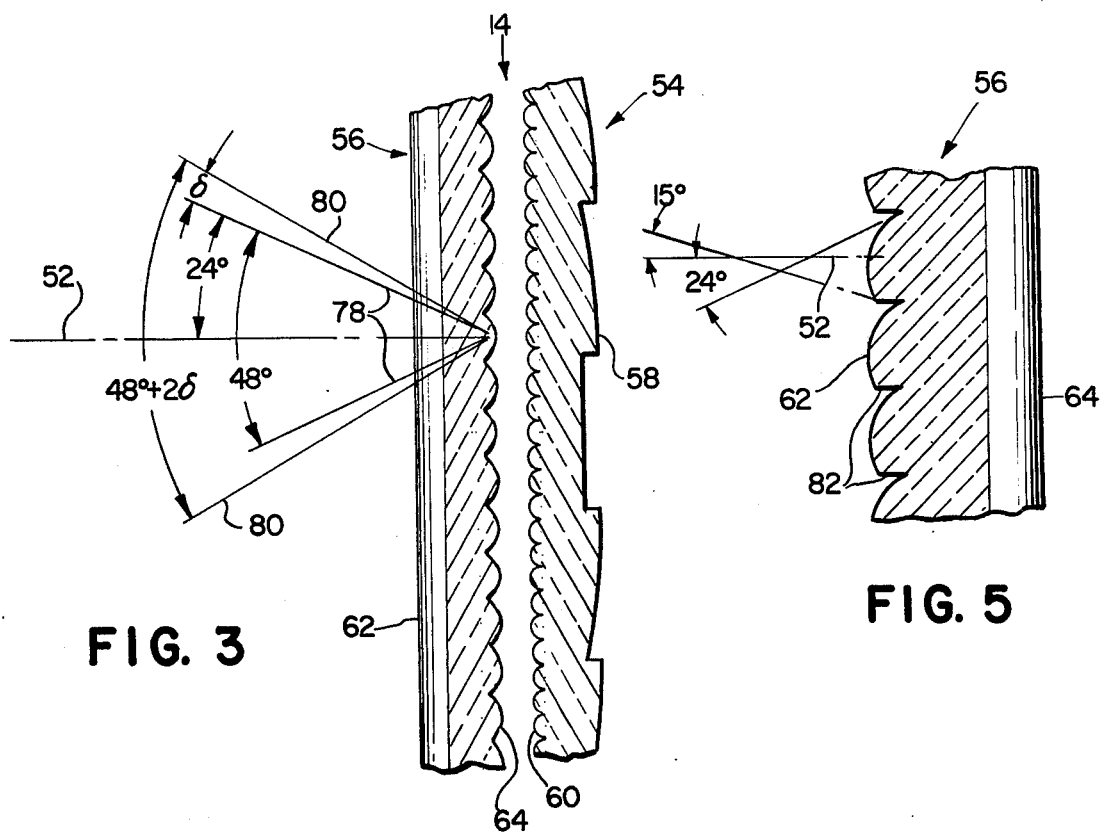
FIG. 3
FIG. 5
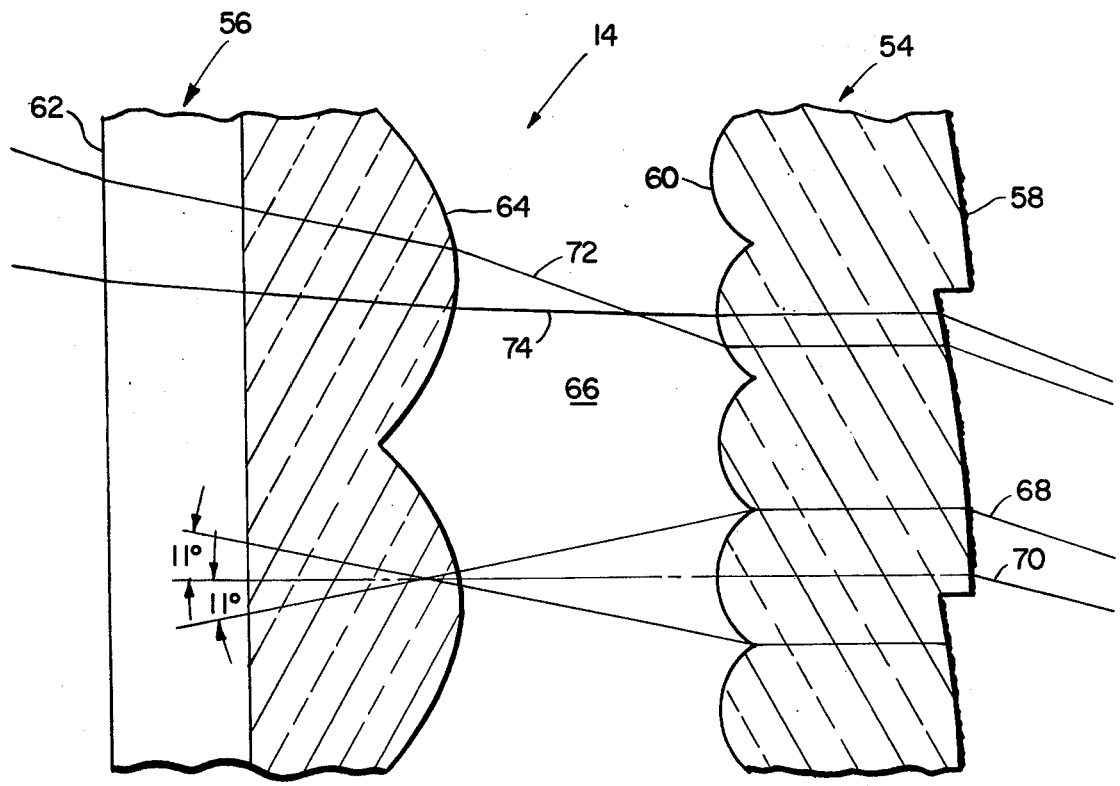
FIG. 4

BACK PROJECTION VIEWING SCREEN

BACKGROUND OF THE INVENTION

1. Field of the Invention

This invention relates to photographic apparatus and, more particularly, to a motion picture rear projection viewing screen.

2. Description of the Prior Art

A rear projection viewer apparatus in which the projection system and the viewing screen are combined in a single structural unit are well known in the prior art. Among other advantages, this type of projector apparatus can provide a compact portable unit which permits satisfactory pictorial displays in high ambient light conditions, and is particularly suited to those instances where available space is limited. Conventionally, apparatus of this type employ a lenticular screen arrangement which directs the projected images over a controlled viewing zone centered along an axis normal to the screen, and hence, do not generally provide a suitable arrangement for directing the viewing zone to an audience located off the screen axis.

In apparatus of this type where a compact system is employed, wide angle projection is commonly utilized, and hence, the viewing screen must also provide a collimating function. An arrangement commonly used in such viewing apparatus is a compound screen structure making use of a Fresnel lens to collimate the transmitted image and a lenticular screen arrangement utilizing a plurality of contoured lenticules for controlled uniform dispersion of the transmitted image over a given viewing zone. A typical screen of this design is shown and described in U.S. Pat. No. 3,848,980 entitled "Projector Apparatus and System Employing Unique Screen" issued Nov. 19, 1974. One of the drawbacks of such a screen design has been the necessity of limiting the horizontal and vertical viewing angles to a relatively small angle in order to provide a sufficiently bright image under ambient light conditions within that viewing region. Recent improvements have resulted in an increase in the brightness of the viewable image within the angular viewing zone. As a result, changes in the contour of the lenticular elements have been experimented with in order to increase the viewing region. It has been found, however, that as the contour of the lenticular elements, i.e., specifically the steepness of the sides of the lenticules has been changed in order to increase the viewing angle, the intensity of back brightness or total internal reflection from these lenticules has increased dramatically. Accordingly, the available viewing angle has been severely limited by the necessity of keeping the back brightness to a tolerable level to permit a good viewable image under normal ambient lighting conditions.

SUMMARY OF THE INVENTION

The present invention provides a projection system and a viewing screen which has a greater angular viewing spread than was before attainable with a screen of the type described hereinabove while having an acceptably low back brightness or reflection from external light rays.

In the preferred embodiment, the back projection screen of the present invention comprises two parallel transparent sheets of plastic, each sheet having its faces optically configured, the surfaces having the following characteristics arranged in the order from the projection side to the viewing side. The first surface is an ordinary circular Fresnel lens to which a light frosted texture has been applied. The second surface comprises a series of vertical convex circular lenticulations joined by sharply defined cusps. The third surface also has a series of vertical convex lenticulations joined by sharp cusps and characterized by an elliptical cross-section. The lenticulations on this third surface have a very different periodicity from that of the second surface to avoid the possibility of moire patterns. The fourth surface, the viewing surface, is formed by a series of parallel horizontal lenticulations, all of the same cross-section, and distinguished by a convex elliptical configuration, each of the convexities being inclined outwardly at the bottom. Each lenticule is therefore joined to the next by an offset surface which is, for the purposes of picture viewing, optically inactive. As pointed out above, back brightness caused by total internal reflection of some ambient light rays has been the limiting parameter upon the spread or viewing angle achievable with a screen of this type. In the screen of the present invention, the series of vertical lenticulations comprising the third surface are the elements which cause the greatest internal reflection problems. The steepness of the sides of these lenticulations in effect control the intensity of the back brightness. i.e., the steeper the sides, the greater the amount of light experiencing total internal reflection.

In order to overcome this problem, according to the present invention, the steepness of the sides of the lenticulations defining the third surface have been maintained at a level wherein back brightness is acceptably low. Further, however, according to the invention, the series of vertical convex circular lenticulations provided on the second surface serve to impart a horizontal spread angle upon the collimated light rays received from the Fresnel lens so that the light rays already have a horizontal spread imparted to them when they encounter the lenticulations of the third surface. The cumulative angular spread imparted by the two sets of vertically extending lenticular elements, accordingly, results in a greater angular spread than was before attainable while permitting a back brightness level lower than previously attainable with a horizontal angular spread of this magnitude.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will be best understood from the following description of the preferred embodiment when read in connection with the accompanying drawings wherein like numbers have been employed in the different figures to denote the same parts and wherein:

FIG. 3 is an enlarged sectional view of a portion of the viewing screen taken along the line 3—3 of FIG. 2;

FIG. 4 is a still further enlarged, fragmentary view of the optical elements of the viewing screen as illustrated in FIG. 3; and FIG. 5 is an enlarged, sectional view of a portion of the front element of the viewing screen as shown in FIG. 2.

DESCRIPTION OF THE PREFERRED EMBODIMENT

Figure 1:
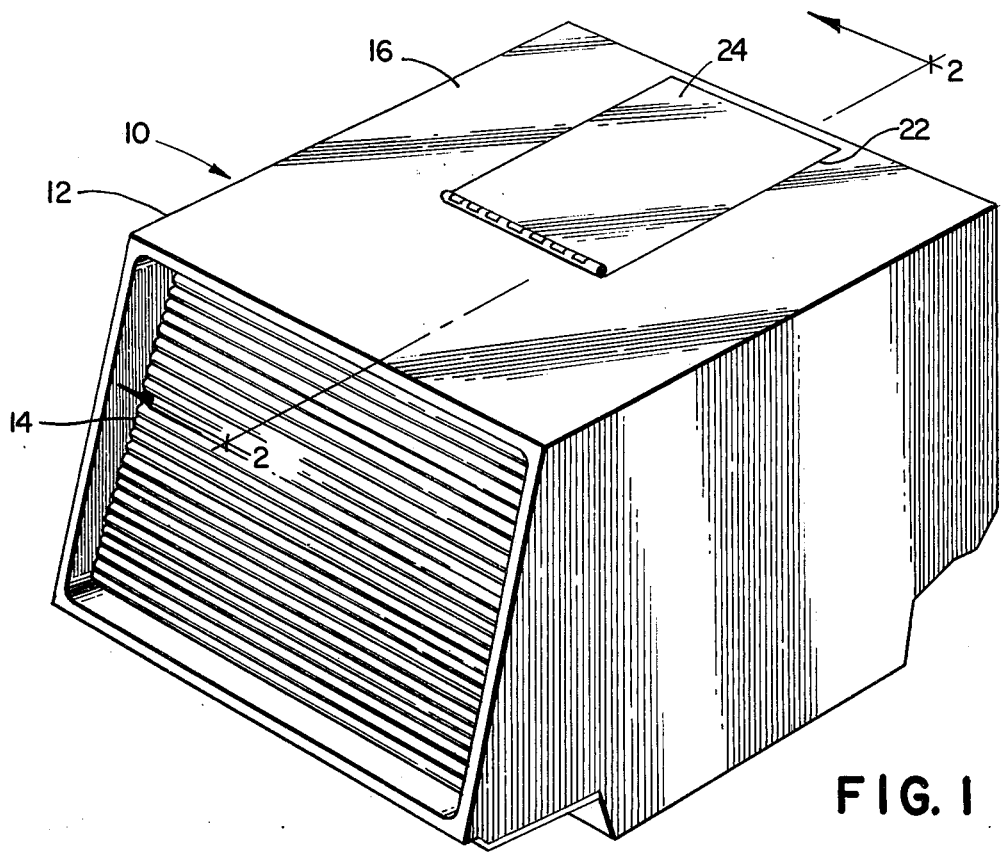
FIG. 1 is a diagrammatic view in perspective of a motion picture viewer having a screen embodying the features of this invention.
Figure 2:
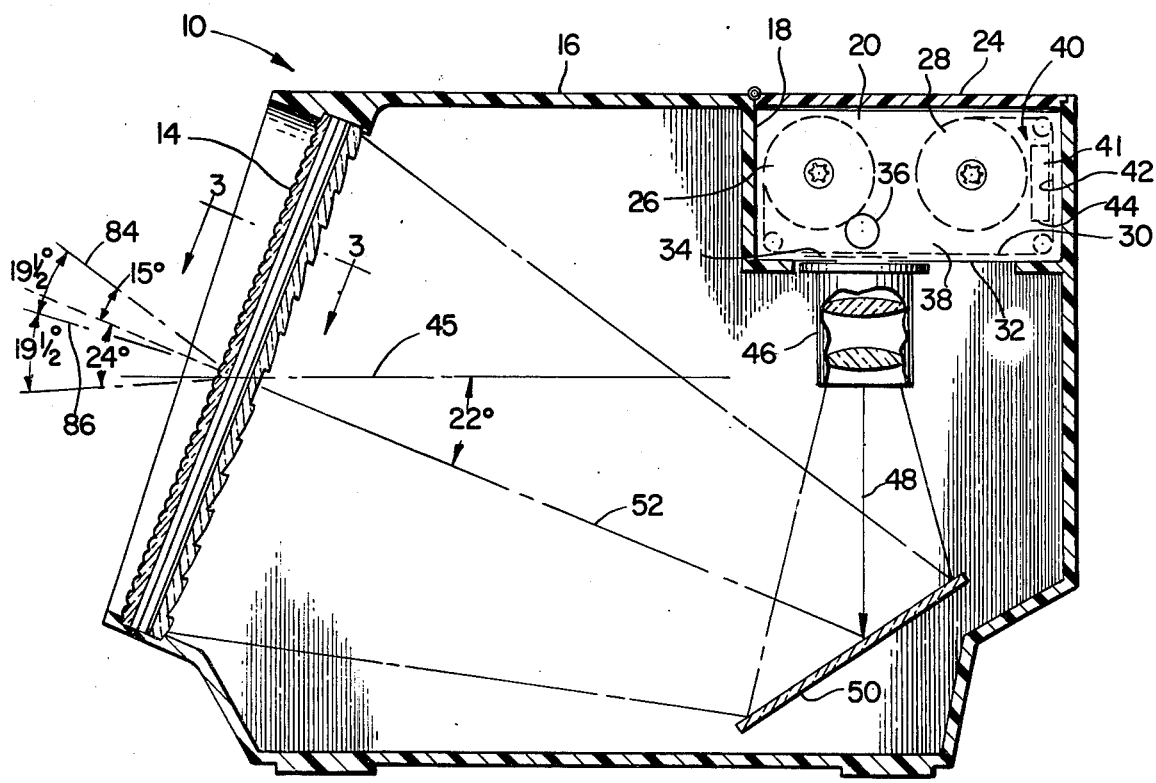
FIG. 2 is a diagrammatic sectional view taken along the line 2—2 of FIG. 1.

As shown in FIGS. 1 and 2, the photographic apparatus of the present invention preferably takes the form of a rear projection viewer 10 comprising a box-like housing 12 defined in part by a front viewing screen 14. Positioned rearwardly of screen 14 and in adjoining relation to the top surface 16 of the housing 12 is a cassette receiving well 18 which is adapted to hold a motion picture film cassette 20 as shown in FIG. 2. The cassette receiving well 18 extends to and is in communication with an opening 22 in the top surface 16 of the housing 12. Pivotally mounted at the forward edge of opening 22 is a door member 24 for controlling access to the cassette well 18. Hence, the door 24 is mounted for pivotal motion between a closed position, blocking the opening 22, and an open position permitting insertion and removal of the cassette 20.

The cassette 20 is a multipurpose motion picture film cassette and may, for example, take the form of the cassette described in U.S. Pat. No. 3,608,455 of Rogers B. Downey, which is designed for exposure, processing and projection without removal of its film from the cassette casing. Preferably, the cassette comprises a generally flat parallelepiped casing enclosing a pair of motion picture film spools 26 and 28 to which a motion picture film strip 30 is attached so as to be disposed for transport between one spool and the other in an arrangement wherein portions of the film are advanced across a film gate or opening 34 which facilitates projection of the film images in a manner to be subsequently described.

Means are also provided in the cassette 20 to permit entrance of suitable illumination and for redirecting such illumination in a downward direction to the film 30 and out of the opening 34. For example, in the illustrated embodiment, an opening 36 is provided in one side wall 38 which adjoins the lower edge 32 of the cassette 20, and a reflector element (not shown) such as a mirror or reflecting prism is included within the cassette to redirect the light entering opening 36, out of the projection station opening 34. Hence, an illumination means (not shown), for example, a conventional projection lamp is mounted in the apparatus in an adjoining relation to the opening 36 so as to suitably direct illumination into the cassette 20. It will therefore be appreciated that the cassette opening 34 serves in part to define an exposure station during a first transport of the film strip 30 thereacross and a projection station during subsequent passes of the film strip thereacross. Carried within cassette 20 is a processing station 40, such as described in the aforementioned U.S. Pat. No. 3,608,455, which includes a processor 41, designed for selective operation for distribution of an appropriate processing fluid (not shown) over the film 30 during transport of the latter past dispensing surface or processor nozzle 42, located near the bottom 44 of the processor. In the preferred embodiment, the processor 41 is perpendicular to the plane of the projection station opening 34, and is intended for operation in an upright attitude which facilitates gravitational flow of its fluid to the lower dispensing nozzle 42. Consequently, the well 18 is adapted to locate the cassette 20 in the vertical plane with its projection edge 32 parallel to the horizontal axis 45 of the viewer 10 and hence, in a horizontal plane.

Included within housing 12 in adjoining relation to the cassette receiving well 18 are means (not shown) for driving spools 26 and 28 for advancing the film strip 30 across opening 34. For example, appropriate drive shafts (not shown) may be adapted to engage the spools 26 and 28 and suitably rotate them, and a conventional claw arrangement (not shown) is adapted to engage film 30 in a conventional manner in the vicinity of the cassette opening 34 so as to progressively advance incremental sections of the film thereacross.

Mounted beneath the cassette receiving well 18, in alignment with the opening 34 is a lens assembly 46, adapted to project an image of the film presented at the opening 34 and focus it in a given plane at a given distance from the film 30. The lens assembly 46 directs an image vertically downward along an optical axis designated as 48 to a reflective means such as a mirror 50, mounted in the path of the optical axis 48 and at an angle thereto so as to redirect the projected image forwardly along an upwardly inclined axis 52 to the rear of the screen 14. The screen is preferably disposed normal to the inclined axis 52 to reduce pictorial distortion and, as later explained in connection with FIG. 5, includes means for redirecting the viewing axis downwardly to partially offset the upward inclination of axis 52. Hence, it should be understood that taken together the projection lamp, lens assembly 46 and mirror 50 provide means for projecting an image carried by the film 30 to the screen 14.

It should be noted that the screen 14 defines substantially the full front face of the viewer housing 12 and that the lens assembly 46 is designed to project to the screen, an image which extends over substantially its full area. Hence, the lens assembly 46 provides a given projection angle and track length between the film 30 and the screen assembly 14. Without the tilted screen arrangement, a uniform image path length could only be accomplished by either the use of a multiple folded path or a film cassette positioned outside the screen extremities, i.e., outside the area bounded by imaginary planes extended in parallel relation from the top and bottom of the screen. The latter would, in turn, result in a screen of small dimension as compared to the profile of the apparatus as viewed from a point forward of the screen. Hence, the structure of a viewer of this type provides a highly compact viewer employing a single mirror, a horizontal film plane, and projection to a rear projection screen which substantially determines the overall size of the front face of the viewer housing. In the structure illustrated, the mirror 50 is positioned at an angle of 34° with respect to the horizontal and hence redirects the vertical projection axis 48 along the axis 52 which is inclined by approximately 22° from the horizontal. As previously indicated, however, the screen 14 redirects this optical axis downwardly so as to project an image over a limited vertical viewing zone which includes the longitudinal axis 45, forwardly of the viewer. Consequently, although the screen is tilted such that its normal is directed upwardly from the longitudinal axis 45 of the viewer 10, the latter is intended for operation on a table of standard (i.e., approximately 30 inch) height with at least some of the viewing audience seated and the viewing zone is canted downwardly from the screen normal such that its lower limits intercept the longitudinal axis 45 of the viewer. Hence, the viewing zone will provide a vertical dispersion suitable for both a seated audience whose eye level is disposed close to the longitudinal axis, i.e., 40 to 45 inches above the floor, as well as a standing audience. This is accomplished by a screen-like lenticular structure which uniformly emits or projects an image over a particular viewing zone (whose vertical extent from only one lenticule is shown in FIG. 2) and additionally directs this viewing zone downwardly by an angle of 4½° from the optical axis normal to the screen.

The configuration of the front surface of the screen with such a downward direction is described in detail in U.S. Pat. No. 3,740,127, "Projector Apparatus", of Philip G. Baker et al., and will subsequently be briefly described herein in connection with FIG. 5 of the drawings.

Turning now to FIG. 3, which is a cross-sectional top view of the viewing screen 14, it will be seen that the screen comprises a lens assembly which includes a rear lens element 54 closely spaced (i.e., about 3/16 inch) from a forwardly positioned element 56. The back surface 58 of the rearward lens 54 is a circular Fresnel lens which is adapted to collimate the projected rays (redirected by mirror 50) and direct them in a substantially parallel direction. In the preferred embodiment, this lens is configured so that if acting independently, it would focus the light rays passing therethrough at a point approximately eight feet from the screen. The surface of the Fresnel lens 58 is fine grained to provide a very moderate diffusion of the projected image which will hide the unavoidable, minor tool imperfections in the other optically configured surfaces to be hereinafter described, which would produce diffraction of the transmitted light. The diffusing surface 58 is configured to produce small angle scattering, as compared to the diverting angle of the other optical surfaces so that its very slight diffusion does not interfere with the function of the sharp cut-off of the viewing zone produced by the other optical surfaces. The fine grain surface may be suitably produced in surface 58 by an impression from a mold made using a solvent spraying technique in combination with molding techniques well known in the sound recording industry. Such a technique is described and claimed in U.S. Pat. No. 3,718,078 entitled "Smoothly Granulated Optical Surface and Method for Making Same" of William T. Plummer. The other side 60 of the rear element of the screen has a plurality of parallel, contiguous rib-like lenticular elements 60 extending substantially vertically as viewed from the front of the screen. This series of vertical lenticulations serves to impart an initial horizontal spread angle to the collimated light rays received from the Fresnel lens so that the projected rays have a certain limited horizontal spread imparted to them when they encounter the forward element 56 of the screen 14.

The forward element 56, which determines the final horizontal and vertical viewing zone, is a crossed lenticular lens having two series of parallel, contiguous rib-like lenticular elements 62 and 64 disposed in crossed relation on the front and rear surfaces thereof, respectively. The periodicity of the series of lenticular elements 62 and 64 as will be subsequently elaborated upon, is significantly less than the periodicity of the series of lenticular elements 60 on the rear element of the screen toward the possibility of moire patterns. Hence, the lenticular elements of one face of the forward element of the screen are orthogonal to the lenticular elements of the other face such that each set of lenticules provides controlled uniform dispersion of the transmitted radiation in respective orthogonal planes. More specifically, the series of lenticular elements 62 on the front of the forward element of the screen control the vertical viewing angle and the series of lenticular elements 64 on the rear of the forward element of the screen control the final horizontal viewing angle. The projected rays received by the series of large lenticular elements 64, as pointed out above, already have a small degree of horizontal angular spread imparted to them by the series of small lenticular elements 60 carried by the rear element 54 of the screen. Accordingly, the final horizontal viewing angle of the screen will be greater than the design spread angle of the series of lenticular elements 64 carried by the front element of the screen. The final spread angle imparted by the combination of the series of lenticular elements 60 and 64 is not a simple additive effect, but rather it may be predicted only by analysis making use of complex mathematical convolutions which will not be elaborated upon herein.

Although the two sets of large lenticules 62 and 64 carried by the front element of the screen may be either convex or concave ribs, they are preferably convex members having a profile contour which includes a portion having a curvature approximately that of an ellipse which provides a substantially uniform dispersion of the projected light over a precise viewing angle with a substantially sharp cut-off at the zone boundaries. The series of small lenticular elements 60 carried by the rear element of the screen 54 also may be either convex or concave and could also be elliptical in cross-section, however, it has been found that because of the fineness of the ruling on the screen and the difficulty of making tooling which could accurately define such a small surface, that a circular cross-section is preferable for this set of elements. It should be understood, however, that in alterative arrangements, other shapes, including substantially circular or parabolic curvatures would also be useful.

For general use, the two series of large lenticular elements 62, 64 forming the forward element of the screen are designed fine enough (i.e., in cross-section) so that particular lenticules cannot be resolved at normal viewing distance from the screen (for example, 5 to 10 feet) and yet coarse enough so that diffraction images of the projection exit pupil as seen through the screen overlap to form a continuum of light. A lenticular screen having 50 to 150 lenticules per inch will satisfy these general requirements. Hence, a typical screen of this type may be formed with approximately 100 lenticules per inch in the two series of lenticules found on the forward element of the screen. In the screen of the preferred embodiment, the periodicity of the rear series of lenticules 64 deviates slightly from the above since such periodicity is related to the number of color stripe segments carried by the particular photographic film employed in photographic cassettes used with the present viewing screen. Such relationship is described in detail in U.S. Pat. No. 3,848,980 entitled "Projector Apparatus and System Employing Unique Screen" of William T. Plummer. Consequently, in an exemplary embodiment, the front lenticules number 100 per inch, whereas the rear lenticules number 94 per inch. In any case, each of these sets of lenticules provide a curved surface, close to a portion of an ellipse, which is configured to provide a substantially uniform dispersion of the transmitted illumination over a predetermined angle.

In the given example, the lenticular curvature of the series of lenticules 62, 64, taken above, are primarily designed to produce an overall vertical and horizontal viewing angle of 39° and 48°, respectively, the latter angles having been found to be suitable for a relatively small audience positioned several feet forward of the viewer. As pointed out above, however, a screen designed in accordance with the present invention includes an additional series of small vertically extending lenticular elements 60 which impart an initial horizontal angular spread to the projected light rays before they encounter the large series of vertically extending elements 64. This series of finely ruled lenticular elements has a periodicity substantially greater than that of the series of elements carried by the forward screen element in order to avoid the possibility of moiré patterns. This finely ruled series of lenticules has been found to produce good results with a periodicity between about 2 to 15 times greater than the periodicity of the lenticules carried by the forward element. In the illustrated embodiment, the periodicity ratio is about 2½:1.

As best illustrated in FIG. 4, in an exemplary embodiment, the projected rays passing from the small lenticules 60 into the air space 66 are caused to refract a maximum of ±11° from the horizontal to the screen as depicted by the rays 68, 70 in FIG. 4. The rays 72 and 74 shown in the upper portion of FIG. 4 illustrate typical light paths, somewhat exaggerated, for a pair of rays projected onto the back of the screen. FIG. 3 illustrates diagrammatically the horizontal spread achieved through use of the present screen configuration. In this figure, the final overall horizontal viewing angle provided by a single lenticule of the vertically extending series 64 is depicted. As was pointed out above, the lenticular curvature of this series of lenticules is designed to produce a horizontal viewing angle of 48° if acting alone. 48° is about the maximum horizontal viewing angle that can be achieved while still exhibiting acceptable back brightness due to total internal reflection of skew ambient light rays. In FIG. 3, the horizontal viewing zone of 48° which would be available with a screen having only the cross lenticular lens configuration of the forward element 56 of the screen, is depicted by the phantom lines identified by reference numeral 78, as 24° above and below the axis 52 normal to the screen. The actual viewing angle which is available from the screen of the present invention is illustrated in FIG. 3 as 48° plus 2δ and is identified by the reference numeral 80. The incremental angle δ represents the additional horizontal spread which this screen configuration is able to impart upon the projected image by virtue of the initial horizontal spread (in the illustrated embodiment ±11°) imparted upon the projected image by the series of small lenticular elements 60 carried by the rear element of the screen 54. Accordingly, a screen designed in accordance with the present invention is capable of providing a screen having a horizontal viewing angle heretofore unachievable with the screen of the back projection type while maintaining an acceptable level of back brightness.

As was pointed out above briefly, the series of lenticules 62 defining the front face of the screen are made asymmetrical so as to rotate the solid vertical viewing angle downwardly with respect to the axis normal to the screen 14 so as to partially offset or compensate for the inclined screen position and thereby provide a vertical viewing zone which includes the longitudinal axis 45 of the viewer. For example, as shown in FIG. 5, the lenticules 62 include substantially flat lower edges 82 which eliminate upper portions, or that is, lowers the upper boundary 84 of the vertical viewing angle as explained in detail in the above referenced U.S. Pat. No. 3,848,980. This results in a substantially downward rotation of the vertical viewing axis 86. In the specific embodiment illustrated, and as shown for one particular lenticule in FIG. 5, the viewing angle of each lenticule 62 as measured in the vertical extends 15° above and 24° below the normal to the screen, and hence, the bisecting axis 86 is rotated 4½ downwardly from the normal to the screen, consequently, since the screen is tilted rearwardly 22° from the vertical, and the dispersion angle extends downwardly 24° from the screen normal, its lower boundary is directed slightly below the horizontal plane (i.e., 2°) and the viewing zone will easily include a viewing audience located along longitudinal axis 45.

In a specific embodiment, each of the screen elements 54, 56 is made by injection molding an acrylic plastic having an index of refraction (n) of 1.49. The Fresnel lens 58 defining the rear surface of the screen is designed to receive the diverging light rays from the mirror 50 and to focus same at a point approximately 8 feet from the screen. The small series of vertically extending lenticular elements 60 have a radius of 0.0056 inches and a periodicity of 250 lenticules per inch. The larger series of vertically extending lenticular elements 64 has a periodicity of 94 lenticules per inch and the curvature of the surface approximates an ellipse and is defined by the polynominal:

$$y = 78.211X^2 + (1.5548 \times 10^5)X^4 + (3.863 \times 10^8)X^6 + (-2.24 \times 10^{12})X^8$$

where X assumes the values $-0.01064 \leq X \leq +0.01064$
This results in a design maximum illuminated angle of 24° from the axis normal to the screen in both directions.

The series of horizontal lenticules 62 defining to front surface of the screen have a periodicity of 100 lenticules per inch and the curvature of the lenticules is defined by the polynominal:

$$y = 68.306X^2 - (1.5807 \times 10^5)X^4 + (2.885 \times 10^8)X^6 - (-5.2 \times 10^{11})X^8$$

where X assumes the values $-0.00388 \leq X \leq +0.00612$
The maximum illuminated angle is 15° above the axis and 24° below the axis.

In an exemplary embodiment, a viewer housing for use with such a screen measuring approximately 10 inches in height, 10 inches in width and 15 inches in length was employed. The front viewing face was made up of a screen 7.2 inches high and 9.2 inches wide having its upper edge mounted approximately one half inch below the top of the unit. A well, disposed in the rear of the top surface was designed to accept a cassette of the described type which measured 5 inches in length, 2¾ inches in height and ⅝ inches in width. A projection lens having a speed of f/0.92 and 0.35 inches focal length mounted beneath the cassette well produced a total projection distance or track length of approximately 17 inches from film to screen, and the projection path was folded by a single mirror placed at the base of the cabinet, approximately 5 inches below the film.

Those familiar with the motion picture arts will readily appreciate the novel and highly unique advantages of this invention which provides a viewer system and rear viewer screen having means for imparting a first horizontal angular spread to a projected image and further means for imparting a final horizontal angular spread to the projected image which is greater than the horizontal angular spread the first means would be capable of imparting to the image if acting alone.

It should be appreciated that, while in the illustrated embodiment the fine series of rulings 60 is carried on the opposite side of the element 54 carrying the Fresnel lens 58, this series of elements could be disposed upon a separate element. As an example, a thin sheet of transparent material carrying such fine rulings could be disposed in parallel relationship with the screen elements 56 and 54 in the air space 66 therebetween.

It should be understood that this invention may be practiced or embodied in still other ways without departing from the spirit or essential character thereof. Hence, the preferred embodiment herein is illustrative and not restrictive, the scope of the invention being indicated by the appended claims and all variations which come within the meaning of the claims are intended to be embraced therein.

What is claimed is:

1. A back projection screen for pictorially displaying upon the front face of said screen an image projected upon the back face of said screen, comprising:

a first light transmitting optically configured element having first and second faces, said first face comprising a circular Fresnel lens configured to substantially collimate the light rays defining the projected image and defining the back face of said screen, the surface of said Fresnel lens having a fine grain diffusing surface and said second face of said first light transmitting element comprising a first series of parallel lenticular elements configured to impart a first restricted horizontal angular spread to said projected image, said first series of lenticular elements having a circular cross section and a first periodicity; and a second light transmitting optically configured element having first and second faces and disposed in spaced parallel relationship with said first element, said first face of said second element facing said second face of said first element and comprising a second series of lenticular elements parallel to said lenticular elements of said second face of said first element, said second series of lenticular elements being configured to receive said projected image having said first horizontal angular spread and for imparting thereto an additional restricted horizontal angular spread resulting in a final restricted horizontal angular spread which is greater than either said first horizontal angular spread or said additional horizontal spread alone, said second series of lenticular elements further having a convex, eliptical cross section, said cross-sectional curve of said second series of lenticular elements being defined in accordance with the following equation:

$$y = 78.211X^2 + (1.5548 \times 10^5)X^4 + (3.863 \times 10^8)X^6 + (-2.24 \times 10^{12})X^8$$

where $-0.01064 \leq X \leq +0.01064$
where X and Y are conventional rectangular coordinates, and said second series of lenticular elements having a second periodicity substantially lower than said first periodicity, and said second face of said second element defining the front face of the screen and comprising a third series of parallel lenticular elements extending substantially orthogonal to said first and second series of lenticular elements and configured to direct said projected image forwardly over a restricted vertical viewing zone, said third series of lenticular elements having a convex, eliptical cross section, said cross-sectional curve of said third series of lenticular elements being defined in accordance with the following equation:

$$y = 68.306X^2 - (1.5807 \times 10^5)X^4 + (2.885 \times 10^8)X^6 - (-5.2 \times 10^{11})X^8$$

where $-0.00388 \leq X \leq +0.00612$,
where x and y are conventional rectangular coordinates, and said third series of lenticular elements having a periodicity substantially the same as said second periodicity.

2. A back projection screen according to claim 1 wherein said first periodicity is about two and one half times greater than said second periodicity.

3. A back projection screen according to claim 1 wherein the cross-sectional curve of said first series of parallel lenticular elements is a portion of a circle having a radius of 0.0056 inches.

4. A back projection screen according to claim 3 wherein the index of refraction of the transparent screen material from which the two screen elements are made is 1.49.

* * * * *